UNITED STATES PATENT OFFICE.

WILLIAM JENKINS SHAW, OF TORONTO, ONTARIO, CANADA, ASSIGNOR, BY MESNE ASSIGNMENTS, TO INTERNATIONAL TOOL STEEL COMPANY, LIMITED, OF TORONTO, CANADA.

COMPOSITION FOR BRIQUETS.

963,400.  Specification of Letters Patent.  Patented July 5, 1910.

No Drawing.  Application filed September 25, 1909. Serial No. 519,583.

*To all whom it may concern:*

Be it known that I, WILLIAM JENKINS SHAW, of the city of Toronto, in the county of York, in the Province of Ontario, Canada, have invented certain new and useful Improvements in Compositions for Briquets, of which the following is the specification.

My invention relates to improvements in a composition for briquets for the reduction or smelting of pulverized iron ores, and the object of the invention is to devise a composition for a briquet, which will facilitate the direct production of steel from iron ore by producing a briquet that—first—will solidify without the application of artificial heat and be ready for furnace use almost immediately upon being formed,—second—will efficiently flux the materials of which it is composed and produce a thin slab,—third—will not disintegrate by heat before the iron oxid has been reduced and the metal released,—fourth—will cause to be disposed upon the hearth of the reduction furnace a pure low carbon steel as a base for high carbon or alloy steel.

My invention consists of a briquet comprising magnetic iron oxid sand, pure pulverized carbon preferably powdered charcoal, silicate sand and a caustic alkali preferably carbonate of sodium, which are mixed together with a suitable binding medium in the proportions and as hereinafter more particularly explained.

To each one hundred pounds of magnetic iron oxid sand or other pulverized iron ore I add 10 to 20 pounds of any pure carbon, preferably powdered charcoal, sufficient for combination with the oxygen of the ore, 6 to 10 pounds of silica sand, 10 to 20 pounds of any strong alkali preferably carbonate of sodium. The foregoing components are mixed dry and then saturated with any adhesive vegetable paste preferably a solution of potato starch in hot water. This paste should be of sufficient consistency to render it strongly adhesive. Pure starch is preferable to any adhesive containing a gluten in which phosphorus is present.

Such a composition, as I describe, when mixed together, in about an hour forms a solid briquet, which incloses the particles of the pulverized ore within a pure carbon protecting it from the oxygen of the blast and from phosphorous fumes when fuel containing these impurities is used.

Such a briquet while combusting on the exterior reduces the oxid by radiation of heat within the briquet and at the same time preserves the integrity of the briquet until finally consumed.

What I claim as my invention is:

1. A briquet comprising magnetic iron oxid sand or pulverized iron ore, powdered carbon, silicate sand and powdered caustic alkali combined with a suitable binding medium as and for the purpose specified.

2. A briquet comprising magnetic iron oxid sand or pulverized iron ore, powdered carbon, silicate sand and powdered caustic alkali combined with starch paste as and for the purpose specified.

3. A briquet comprising one hundred pounds of magnetic iron oxid sand or pulverized carbon ore or thereabout, ten to twenty pounds of powdered charcoal or thereabout, six to ten pounds of silicate sand or thereabout and ten to twenty pounds or thereabout of caustic alkali combined with a starch paste from which glutinous material has been eliminated as and for the purpose specified.

4. A briquet comprising one hundred pounds of magnetic iron oxid sand or pulverized carbon ore or thereabout, ten to twenty pounds of powdered charcoal or thereabout, six to ten pounds of silicate sand or thereabout and ten to twenty pounds or thereabout of such as carbonate of sodium combined with a starch paste from which glutinous material has been eliminated as and for the purpose specified.

WILLIAM JENKINS SHAW.

Witnesses:
B. BOYD,
R. COBAIN.